Nov. 29, 1960 A. KUSKO 2,962,608
REGULATORS
Filed Oct. 2, 1958
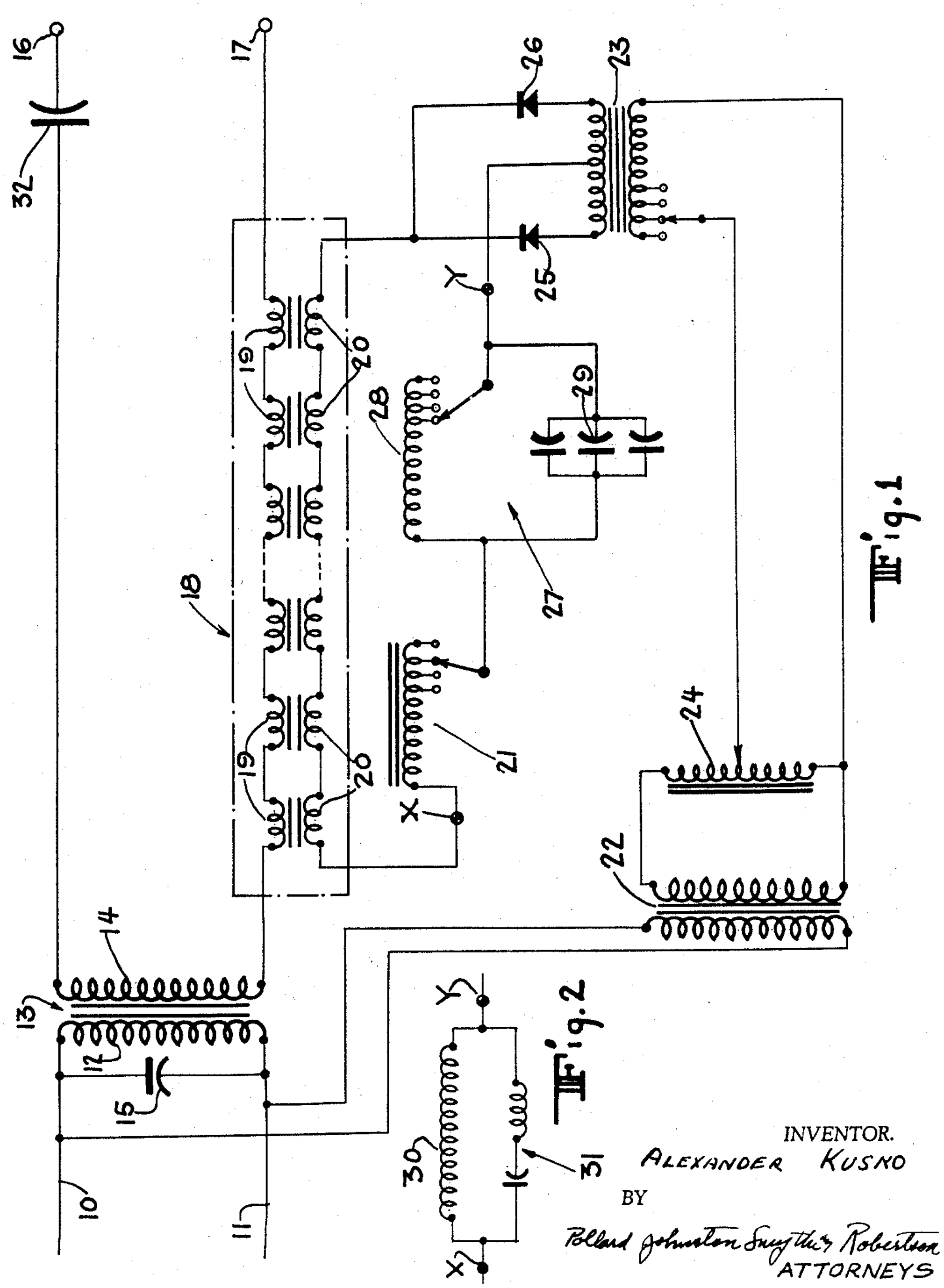

United States Patent Office 2,962,608

Patented Nov. 29, 1960

2,962,608

REGULATORS

Alexander Kusko, Newton Center, Mass., assignor, by mesne assignments, to Basic Products Corporation, Milwaukee, Wis., a corporation of Wisconsin Filed Oct. 2, 1958, Ser. No. 764,842

5 Claims. (Cl. 307—106)

This invention relates to saturable reactors and particularly to arrangements for controlling load current and wave shapes by polyunit saturable reactors independent of rapid electrical disturbances in the system.

One of the problems in saturable reactors employed in circuits to control load current as to wave shape and current is the cost of the components in the circuit. In the control of wave form, it may be desirable to have a pure sinusoidal wave or a "one-half power sinusoidal wave." The wave shape of the latter may be defined by the formula $i=[\sin(wt)]^{1/2}$. In some of the exacting requirements of control, the reactor components may become so large as to be uneconomical to use.

One of the objects of the invention is to provide a saturable reactor arrangement which will regulate load current and wave shape regardless of disturbances in the electrical system.

In one aspect of the invention, the current and wave form regulator may have a plurality of saturable reactors, each having a load and control winding. These may be on a single core or a plurality of cores. The load windings are connected to an A.C. load circuit and the control windings are connected in series with a source of D.C. The core area and turn ratios of the saturable reactors are related as set forth hereafter so as to provide the desired wave shape. A resonant circuit means may be connected in the control circuit, the resonant circuit or network being tuned to give high impedance to an even harmonic frequency of the A.C. load circuit, preferably the second harmonic, although it may remove higher even harmonics as well. Preferably, an inductor means also is included in the control circuit. The resonant control circuit may take the form of a parallel inductor and capacitor network or it may be a network including a series connected inductor and capacitor in parallel with an inductor.

These and other objects, advantages and features of the invention will become apparent from the following description and drawings which are merely exemplary.

In the drawings:

Fig. 1 shows one form of circuit employing the invention.

Fig. 2 shows an alternative form of the resonant control network that can be used in Fig. 1.

The arrangement of the present invention can be used for various purposes wherein the load current and wave form must be regulated in order to provide desired results. As one example, the A.C. power supply for arc welding of metals, such as aluminum, has special exacting requirements of current and wave shape.

An example of one system embodying the invention is illustrated in Fig. 1 wherein an A.C. load is applied by leads 10 and 11 to primary 12 of input transformer 13. Input transformer 13 may be a conventional transformer wound and arranged to give the desired voltage across secondary 14. If desired, a capacitor or similar means 15 can be connected across the primary so as to provide power factor correction if needed.

Secondary 14 is connected to load terminals 16, 17 through a polyunit saturable reactor indicated generally by 18. One form of the polyunit reactor is described in detail in copending application Serial No. 536,156, filed September 23, 1955, now Patent No. 2,916,689, issued December 8, 1959. The polyunit saturable reactor may have a plurality of load windings 19 connected in series, preferably three or more, although it has been found that under some circumstances the system will operate with only two. Each saturable reactor load winding has a control winding 20.

The turns ratio of the various windings and the core areas are related so that as the A.C. voltage wave in the supply cycle is impressed on the system, the saturable reactor units will desaturate in a predetermined manner to produce the desired current wave form. The turns ratio is chosen so that the desired steps of a cycle in the load current wave form will produce a sinusoidal or other desired form of wave.

As a core is unsaturated, it will function similar to a two-winding transformer so as to force the A.C. line current to be related to the D.C. control current by the winding-turns ratio of the core which is unsaturated.

An inductance is used in the control circuit. In the arrangement shown, a reactor or inductor 21 is connected in series with control windings 20 of the polyunit saturable reactor 18.

The D.C. control source of the control circuit may be from control circuit supply transformer 22 connected across supply lines 10 and 11, the transformer being in turn connected to rectifier supply transformer 23 through a suitable auto transformer 24. Rectifiers 25 and 26 fed from transformer 23 are connected to the control circuit.

Resonant circuit network means 27 may include an inductor 28 connected in parallel with capacitors 29 to form a parallel inductance capacitance circuit. The circuit is tuned so as to remove the second or an even harmonic component introduced into the control circuit from the load windings. It has been found that if the second harmonic component normally is removed, that a predictable load current wave shape can be obtained. There may be more than one such network connected in series in the control circuit.

Another form of suitable resonant network is seen in Fig. 2 which can be used in place of the parallel circuit 27 between points X, Y of Fig. 1. Inductor 30 is connected in parallel with the series inductance capacitance leg 31 of the network. Also, there may be a plurality of series inductance capacitor legs connected in parallel with the inductor 30. In the network of Fig. 2, inductor 30 will permit passage of the D.C. component in the control circuit.

The system described can be used for various control purposes. As mentioned, it has been found especially useful in the power supply for arc welding of aluminum or the like. In such an instance, the D.C. component in the load circuit caused by rectification at the arc can be removed by a capacitor 32 or other similar means as is known in the art.

It should be evident that details of the system can be changed without departing from the spirit of the invention except as defined in the appended claims.

What is claimed is:

1. In a current and wave form regulator system for an A.C. load circuit, the combination including a polyunit saturable reactor having at least three saturable reactors, $n$ phase groups of load winding means, the load winding means in a phase group being connected only in series, control windings, and only $2n$ reactor load current terminals, the terminals being located at the ends of each group, means for connecting alternating current with said load winding terminals, means connecting a source of direct current and said control windings in series with each other, each of said reactors having its turns and core area related to the turns and core area of the others, so that once during each cycle of said alternating current, the cores of at least some of said reactors pass from a saturated condition in one direction of magnetization to a saturated condition in the opposite direction of magnetization, the cores returning to a saturated condition in the first direction within said cycle of said alternating current, the cores making the transition from a saturated condition in one direction to a saturated condition in the opposite direction in a predetermined sequence and during intervals of time of predetermined length, at least one core being in the state of transition from one saturated condition to the other and there being some cores in a saturated condition, and resonant circuit network means in said control circuit tuned to give high impedance to at least one even harmonic frequency of the A.C. load current induced in the control circuit.

2. In a current and wave form regulator system for an A.C. load circuit, the combination including a polyunit saturable reactor having at least three saturable reactors, each having load and control windings, said control windings being connected in series with a source of D.C., said load windings being connected in series, each of said reactors having its turns and core area related to the turns and core area of the others, so that once during each cycle of said alternating current, the cores of at least some of said reactors pass from a saturated condition in one direction of magnetization to a saturated condition in the opposite direction of magnetization, the cores returning to a saturated condition in the first direction within said cycle of said alternating current, the cores making the transition from a saturable condition in one direction to a saturated condition in the opposite direction in a predetermined sequence and during intervals of time of predetermined length, at least one core being in the state of transition from one saturated condition to the other and there being some cores in a saturated condition, inductor means in the control circuit, and resonant circuit network means in said control circuit tuned to give high impedance to an even harmonic frequency of the A.C. load current induced in the control circuit.

3. In a current and wave form regulator system for an A.C. load circuit, the combination including a polyunit saturable reactor having at least three saturable reactors, each having load and control windings, said control windings being connected in series with a source of D.C., said load windings being connected in series, each of said reactors having its turns and core area related to the turns and core area of the others, so that once during each cycle of said alternating current, the cores of at least some of said reactors pass from a saturated condition in one direction of magnetization to a saturated condition in the opposite direction of magnetization, the cores returning to a saturated condition in the first direction within said cycle of said alternating current, the cores making the transition from a saturated condition in one direction to a saturated condition in the opposite direction in a predetermined sequence and during intervals of time of predetermined length, at least one core being in the state of transition from one saturated condition to the other and there being some cores in a saturated condition, inductor means in the control circuit, and a resonant combined inductance and capacitance means to form a circuit in said control circuit tuned to give high impedance to an even harmonic frequency of the A.C. load current induced in the control circuit.

4. In a current and wave form regulator system for an A.C. load circuit, the combination including a polyunit saturable reactor having at least three saturable reactors, each having load and control windings, said control windings being connected in series with a source of D.C., said load windings being connected in series, each of said reactors having its turns and core area related to the turns and core area of the others, so that once during each cycle of said alternating current, the cores of at least some of said reactors pass from a saturated condition in one direction of magnetization to a saturated condition in the opposite direction of magnetization, the cores returning to a saturated condition in the first direction within said cycle of said alternating current. the cores making the transition from a saturated condition in one direction to a saturated condition in the opposite direction in a predetermined sequence and during intervals of time of predetermined length, at least one core being in the state of transition from one saturated condition to the other and there being some cores in a saturated condition, inductor means in the control circuit, and a resonant combined inductance and capacitance means in parallel to form a circuit in said control circuit tuned to give high impedance to an even harmonic frequency of the A.C. load current induced in the control circuit.

5. In a current and wave form regulator system for an A.C. load circuit, the combination including a polyunit saturable reactor having at least three saturable reactors, each having load and control windings, said control windings being connected in series with a source of D.C., inductor means in the control circuit, and resonant circuit means including a network having series connected capacitor and inductor means in parallel with an inductor connected in said control circuit tuned to give high impedance to at least one even harmonic frequency of the A.C. load current induced in the control circuit.

References Cited in the file of this patent

UNITED STATES PATENTS

| | | |
|---|---|---|
| 2,714,188 | Scherer | July 26, 1955 |
| 2,767,371 | Beaubien | Oct. 16, 1956 |
| 2,825,864 | Eagan | Mar. 4, 1958 |